Figure 1:
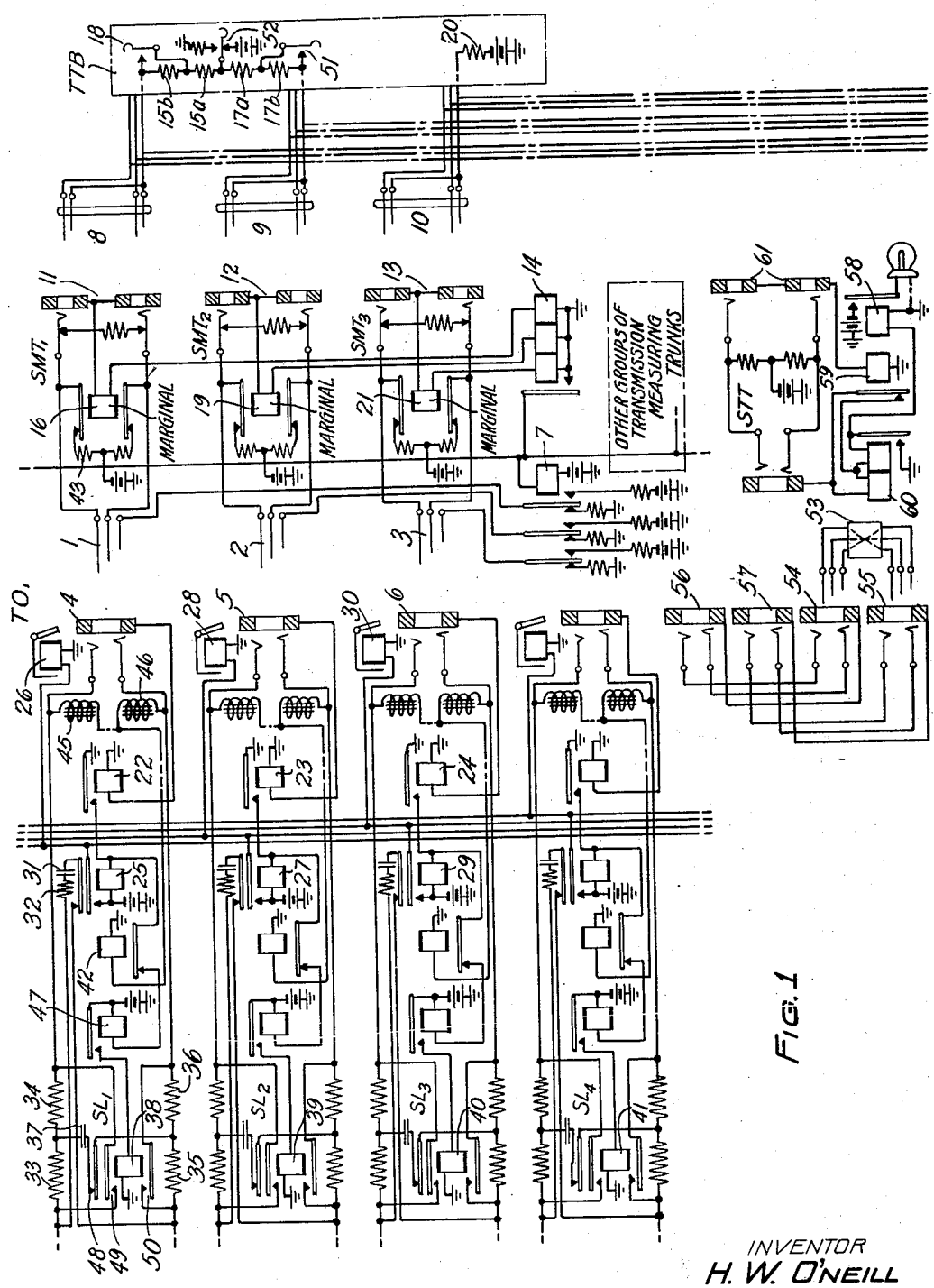

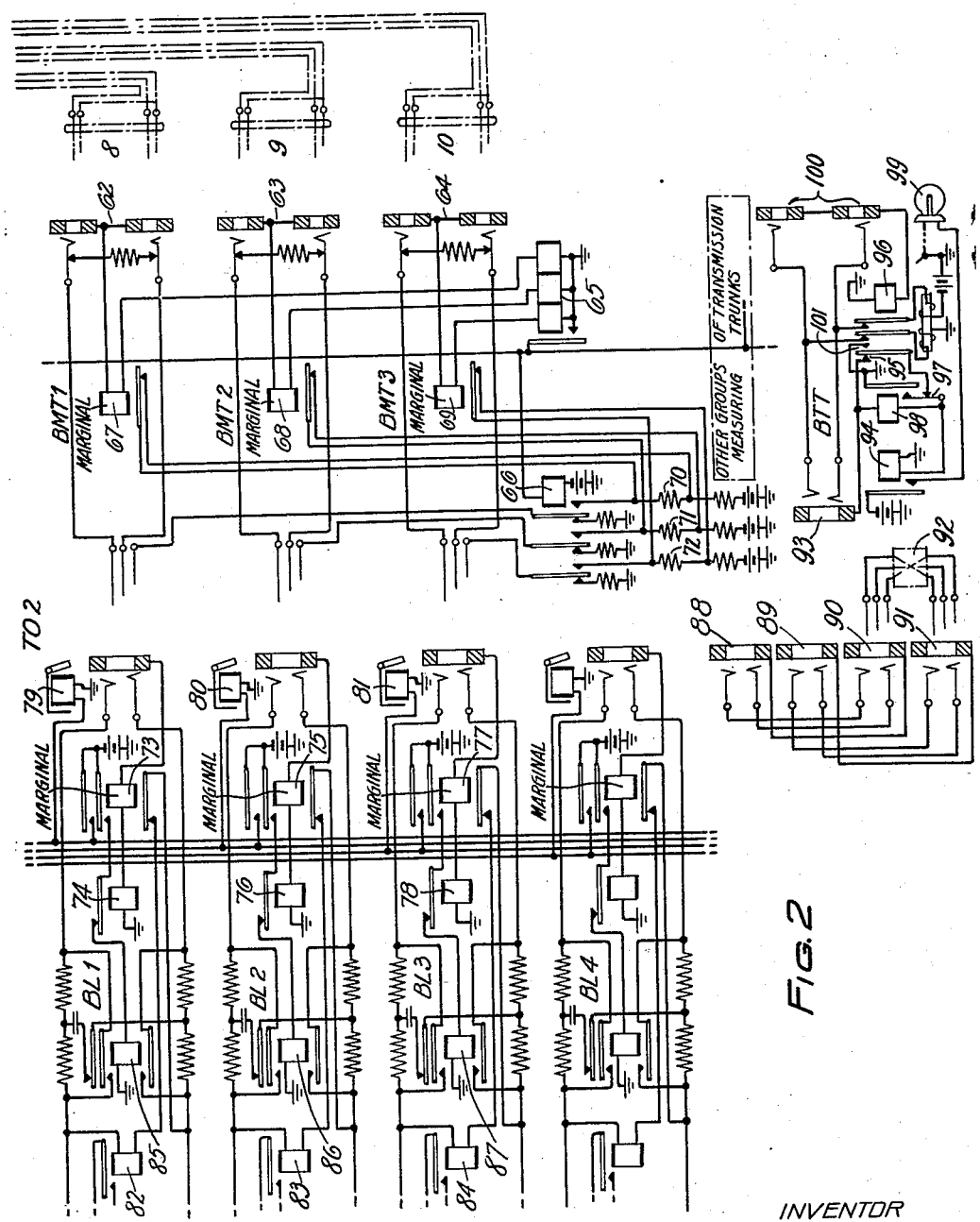

Patented Nov. 11, 1930

1,780,937

UNITED STATES PATENT OFFICE

HENRY W. O'NEILL, OF ELMHURST, NEW YORK, ASSIGNOR TO BELL TELEPHONE LABORATORIES, INCORPORATED, OF NEW YORK, N. Y., A CORPORATION OF NEW YORK

TESTING SYSTEM

Application filed May 25, 1929. Serial No. 365,913.

This invention relates to a transmission measuring or testing system and more particularly to a trunking arrangement for such systems whereby lines, appearing at a switchboard, may be extended to a point distant from the switchboard where facilities are provided for testing or measuring the transmission characteristics of the lines.

An object of the invention is to facilitate testing of telephone lines whereby transmission faults may be readily and quickly identified.

A feature of the invention resides in means associated with a plurality of trunk circuits running between a toll switchboard and the testing point, and controlled from the testing end, whereby all toll lines extended to the testing point over said trunks are conditioned for conversation and indicated as busy in the usual manner as long as the testing equipment is connected to any one of said trunks and, conversely, are all restored to normal and indicated as idle as soon as the testing equipment is disconnected therefrom.

Another feature of the invention resides in means associated with said trunk circuits whereby exclusion of transmission loss pads, normally included in the lines under test, may be controlled from the testing equipment.

A further feature of the invention resides in an improved relay arrangement for talking trunk circuits, running between said switchboard and the testing point, whereby a line signal is displayed at the testing end of the trunk when the line is seized at the switchboard and whereby supervisory signals are transmitted in the opposite direction.

The features of the invention will appear from the following description and the accompanying drawing in which:

Fig. 1 represents a group of three transmission testing trunk circuits $SMT^1$, $SMT^2$ and $SMT^3$ adapted to connect any three of the sleeve supervision toll lines $SL^1$, $SL^2$, $SL^3$ and $SL^4$, terminating at the toll operator's position $TO^1$ with transmission testing equipment indicated as TTB. A talking trunk circuit STT is also shown which provides facilities whereby the toll operator can signal and talk with the transmission test man.

Fig. 2 represents a similar group of three trunks for connecting bridge supervision toll lines $BL^1$, etc., with the same or like testing equipment. A talking trunk BTT similar in character to STT but adapted to function with the operator's cord circuits at position $TO^2$ is also shown.

The invention will be best understood by describing the connection of three toll lines to the testing equipment TTB and it will therefore be first assumed that either for the purpose of making a routine test or because of reported poor transmission, the attendant at the testing point desires to measure the transmission characteristics of sleeve supervision toll lines $SL^1$, $SL^2$ and $SL^3$ appearing at toll position $TO^1$. Therefore the attendant at the transmission testing point, to be hereinafter referred to as the test man, requests the toll operator at position $TO^1$, over an instruction circuit not shown, to connect transmission measuring trunks $SMT^1$, $SMT^2$, $SMT^3$, with the toll lines in question by inserting plugs 1, 2 and 3 into toll line jacks 4, 5 and 6.

When plug 1, for example, is inserted in jack 4, a "simplex" circuit for operating relay 42 in the toll line is completed which can be traced from battery over parallel paths including resistances 43 and 44, upper and lower normal contacts of relay 16, the tip and ring of the trunk and toll line, impedances 45 and 46, and winding of relay 42 to ground. Relay 42 in operating opens the circuit of relay 47, thereby preventing its operation when relay 22 operates which will be later described.

This connection, however, unlike the connection of an ordinary operator's cord circuit or trunk, has no busying effect on the connected toll line, at this time, due to the fact that the sleeves of plugs 1, 2 and 3 are normally free from battery potential and are grounded at back contacts of relay 7. The seized toll lines therefore continue in normal service and may be taken for use at any position at which they are multipled until such a time as the test man is ready to take control of them. When the test man is ready to make the desired tests, he will insert one or more of the double plugs 8, 9 and 10, associated with the testing equipment, into the corresponding double trunk jacks 11, 12 and 13 whereupon relay 14 operates from battery at the test board TTB over one or more of the obvious sleeve circuits shown. One circuit may be traced from battery, contacts of key 52, resistances 15$^a$ and 15$^b$, sleeve contacts of plug 8 and jack 11, winding of marginal relay 16 and right-hand winding of relay 14 to ground. Another circuit can be traced from battery, key 52, resistances 17$^a$ and 17$^b$, sleeve contacts of plug 9 and jack 12, marginal relay 19, and middle winding of relay 14 to ground and a third circuit can be traced from battery, resistance 20, sleeve contacts of jack 10 and plug 13, marginal relay 21 and left-hand winding of relay 14 to ground.

Relay 14 operates in one or all of these circuits, but relays 16, 19 and 21 being marginal will not operate in circuit with their respective series resistances 15$a$ and $b$, 17$a$ and $b$, and 20 and consequently remain inert.

While a single relay 14 having three windings is shown, three single relays can obviously be used to accomplish the same result.

The operation of relay 14 completes an obvious energizing circuit for relay 7. Relay 7 in operating removes the ground connection from the sleeves of the connected toll lines and by connecting battery at its front contacts, completes energizing circuits for relays 22, 23 and 24. Operation of relay 22 completes an obvious circuit for relay 25 which in turn operates busy signal 26, and all other busy signals associated with line SL$^1$ at its multiple appearances. Relay 23 operates relay 27 which energizes busy signals 28, etc., and relay 24 operates relay 29 which energizes busy signals 30, etc.

Operation of relay 25 also opens the normally closed impedance bridge, including condenser 31 and resistance 32, across the line SL$^1$ thereby conditioning the line for talking. Operation of relays 27 and 29 also open similar impedance bridges normally across lines SL$^2$ and SL$^3$ respectively.

The toll lines connected to the testing equipment are now indicated as busy and the test man can listen in, by means of telephone equipment associated with the test board but not shown, and when the lines become idle he may proceed with the desired tests.

No description of the method of testing, and the equipment for making these tests, is attempted in this application as such method and equipment form no part of the present invention.

Interposed in the lines SL$^1$, etc., are what are known as "transmission loss pads" for controlling transmission over the lines. These transmission pads consist of series resistance and shunt capacity.

The pad for line SL$^1$ is indicated by series resistances 33, 34, 35 and 36 and the shunt capacity by condenser 37. Similar pads are interposed in the other lines, SL$^2$, SL$^3$ and SL$^4$.

Under certain conditions it may be desired to render these loss pads ineffective and therefore each pad has an associated control relay 38, 39, 40 and 41, respectively, which is adapted, when operated, to open the capacity shunt and short-circuit the series resistances. These pads and similar relay control means are shown in the copending application filed by Glezen et al., Serial No. 291,682, filed July 10, 1928.

In case the test man desires to effectively remove the pad from toll line SL$^1$, for example, he will operate key 18 associated with the test board TTB, thereby short-circuiting resistance 15$^b$, whereupon marginal relay 16 operates in series with the right-hand winding of relay 14. Relay 16 in operating opens at its upper and lower contacts the "simplex" circuit previously described, whereupon relay 42 releases, thereby closing the circuit for operating relay 47 which was prepared when relay 22 operated.

Relay 47 in operating completes an obvious circuit for operating relay 38 which in operating opens at its contacts 48 a capacity shunt across the toll line, which includes condenser 37, and closes its contacts 49 and 50, thereby placing short-circuits around the series resistances 33 and 34, and 35 and 36 respectively. Release of key 18 increases the resistance of the circuit of relay 16 which thereupon releases, which causes relay 42 to again operate. Operation of relay 42 releases relay 47 which in turn releases relay 38 which removes the short-circuit from the line resistances 33, 34, 35 and 36 and reconnects the capacity shunt across the line.

Operation of key 51 in a like manner effectively removes the loss pad from line SL$^2$ or any other similar line with which the plug 9 may be associated.

In the present circuit arrangement, it is not considered necessary to remove the pad from the line (SL$^3$) which may be associated with plug 10. The reason for this has to do with the method of making the desired tests, and the functions of the testing equipment associated with plug 10. It therefore needs no further explanation. It is obvious, however, that pad control could be provided by adding a key similar to 18 or 52 to vary the resistance of the circuit including relay 21.

In case the test man desires to test the transmission through one of the toll operators' cord circuits 53 he can instruct the operator to plug one end of the desired cord into patching jack 54 and the other end into patching jack 55 and also to connect plug 1 of the transmission testing trunk SMT¹ into jack 56 and plug 2 of trunk SMT² into jack 57.

As operators' cord circuits, usually employed, are so arranged as to meet ground on the sleeve of the jacks with which they are connected, it is necessary that the cord circuit 53 be tested under this condition and, therefore, as relay 7 will be operated when the test man connects any one of the plugs 8, 9 or 10 into any one of the jacks 11, 12 or 13, some means must be provided for releasing relay 7 under this condition, in order that ground be substituted for the battery on the sleeve of plugs 1, 2 and 3. This is accomplished in the present arrangement by operating key 52 which opens two of the energizing circuits for relay 14. This in turn releases relay 7 which disconnects battery from the sleeves of plugs 1, 2 and 3 and substitutes ground therefor, thus satisfying the desired condition at the toll office.

Should the toll operator at TO¹ desire to communicate with the test man, a talking trunk circuit STT is provided into which she may plug the calling end of any one of her cord circuits, for example 53. This results in the operation of relay 58, a circuit for which can be traced from the cord circuit sleeve battery (not shown), sleeve of the plug and jack, normal contacts of relays 59 and 60 and winding of relay 58 to ground. It will be noted that both windings of relay 60 are short-circuited at this time by its own normally closed contacts and those of relay 59. Operation of relay 58 closes an obvious circuit to light the line lamp at the test desk TTB. Operation of relay 59 removes the short circuit which previously existed around the left-hand high resistance winding of relay 60, which relay thereupon energizes and locks up to ground at its alternate contacts in series with both its high and low resistance windings and at the same time short-circuits relay 58 which releases and extinguishes the line lamp. Substitution of the combined high and low resistances of relay 60 for the low resistance winding of relay 58 causes a marginal supervisory relay (not shown) in the cord circuit to release and extinguish the cord supervisory signal which was displayed when the toll operator plugged into the trunk jack. Cord circuits which operate on differences in the resistance of the sleeve circuit to control supervisory signals are well known, such a cord circuit being shown in U. S. Patent 1,608,524.

When the test man disconnects by removing plug 10 from jack 61 of the trunk, relay 59 releases and short-circuits the left-hand high resistance winding of relay 60 but relay 60 does not release at this time as it is held energized by its right-hand low resistance winding. This reduction of resistance in the sleeve circuit causes the toll cord supervisory relay to again operate and display the supervisory signal. When the toll operator disconnects from the trunk, relay 60 releases.

The toll lines BL¹, etc., of Fig. 2 are of the well-known bridge supervision ring-down type and differ in some respects from SL¹, etc., of Fig. 1. They therefore require that the transmission testing trunks, whereby connection is effected with the transmission test board, shall be modified slightly in order that the same operating features previously described may be retained.

It should be understood that, in general, the toll operator's position TO¹ of Fig. 1 will be in one toll office and position TO² in another office, which may be either in the same building or separate therefrom, and that a single transmission test board TTB located at any convenient point, either in one of the two toll offices or elsewhere, serves both offices.

The cords and plugs shown by the dotted lines at the right of Fig. 2 are the same as those shown on Fig. 1 and are, therefore, given the same reference characters.

If it is desired, as in the previous case, that lines BL¹, BL² and BL³ be connected to the transmission test board TTB by means of trunks BMT¹, BMT² and BMT³ then when the test man inserts one or more of the plugs 8, 9 and 10 into jacks 62, 63 or 64, relay 65 will operate from battery on the test cord sleeves. Relay 65 operates relay 66 which removes ground from the sleeves of trunks BMT¹, etc., and substitutes battery therefor. Relays 67, 68 and 69, being marginal, do not operate in series with their respective series resistances 15ª and 15ᵇ, 17ª and 17ᵇ, and 20, and therefore short-circuits remain closed, at the normal contacts of relays 67, 68 and 69, around resistances 70, 71 and 72. Relays 73, 74, 75, 76, 77 and 78 operate in response to operation of relay 66. Operation of relays 73, 75 and 77 close, at their uppermost contacts, obvious energizing circuits for busy signals 79, 80 and 81 and open at their lower contacts the circuits of the bridged ringing relays 82, 83 and 84. Also relays 73, 75 and 77 prepare, at their middle contacts, circuits for operating the pad control relays 85, 86 and 87, but these circuits are broken, at this time, by the operation of relays 74, 76 and 78. Operation of key 18 short-circuits resistance 15ᵇ which causes marginal relay 67 to operate thereby removing the short-circuit from resistance 70 which decreases the current flowing in the sleeve circuit to such a value that marginal relay 74, in the toll line, releases, thereby closing at its normal contacts the previously prepared circuit for operating relay 85 which effectively removes the pad from line BL¹ by opening the capacity bridge and short-circuiting the series resistances as previously described in connection with Fig. 1. The pad associated with line BL² would be effectively removed, in a similar manner, by operating key 52.

The function of patching jacks 88, 89, 90 and 91 is exactly the same as that of jacks 56, 57, 58 and 59 of Fig. 1, i. e., to permit the test man to measure the transmission characteristics of any cord circuit at position TO² such as cord circuit 92, for example.

The talking trunk BTT of Fig. 2 functions in a similar manner to STT of Fig. 1. When the toll operator inserts a plug of one of her cord circuits, such as 92, into jack 93, line relay 94 operates in a circuit from battery (not shown) on the sleeve of the cord circuit 92, contacts 95 of relay 96, contacts 97 of relay 98 and winding of relay 94 to ground. Relay 94 operates and closes an obvious circuit to light the line lamp 99 at the test board. When the test man answers by inserting plug 10 into the double jack 100, sleeve relay 96 operates from battery associated with the sleeve of plug 10. Relay 96 in operating opens the battery bridge normally standing across the trunk and also opens the short-circuit around relay 98 by breaking contacts 95. It also closes its contacts 101, thereby short-circuiting relay 94 which thereupon releases to extinguish line lamp 99. The winding of relay 98 is now substituted for the winding of relay 94, which is short-circuited. Relay 98 operates in the previously mentioned sleeve circuit and locks itself operated, and relay 94 short-circuited, under control of the toll operator's cord circuit.

In the case of Fig. 2, the toll cord circuit 92 differs from cord circuit 53 of Fig. 1 in that the cord supervisory signal is controlled by a supervisory relay in series with one of the talking conductors (ring) of the cord instead of the sleeve conductor as in the case of 53 and, therefore, when cord 92 was first plugged into jack 93, before the test man answered, the supervisory relay operated from battery, supplied over contacts of relay 96, and the talking conductors of the trunk and cord circuit. Operation of relay 96 removed this battery bridge and caused the release of the cord supervisory relay which extinguished the supervisory signal.

It will be noted in connection with both trunks STT of Fig. 1 and BTT of Fig. 2 that the line relays 58 of Fig. 1 and 94 of Fig. 2 are both controlled in their operation and release by the removal or connection of a shunt around their windings, there being no series contacts involved, which under certain conditions might cause irregular operation of the relays in question.

What is claimed is:

1. In a transmission measuring system, a plurality of lines to be tested, a busy signal for each line, a plurality of groups of trunks, each formed from a plurality of individual trunks, means for connecting any one of the lines with one end of any one of the trunks, a testing circuit including transmission measuring means, means for connecting said testing circuit with the other end of any one of said trunks, and means automatically responsive to such connection to actuate the busy signals associated with all of the lines connected to said trunks.

2. In a transmission measuring system, a plurality of lines to be tested, each line comprising means for conditioning the line for conversation, a plurality of groups of trunks, each formed from a plurality of individual trunks, means for connecting any one of the lines with one end of any one of the trunks, a testing circuit including transmission measuring means, means for connecting said testing circuit with the other end of any one of said trunks, and means automatically responsive to such connection to actuate the conditioning means associated with all of the lines connected to said trunks.

3. In a transmission measuring system, a plurality of lines to be tested, respectively associated means for conditioning each of said lines for conversation, a busy signal for each line, a plurality of groups of trunks, each formed from a plurality of individual trunks, means for connecting any one of the lines with one end of any one of the trunks, a testing circuit including transmission measuring means, means for connecting said testing circuit with the other end of said trunks and means automatically responsive to such connection to actuate said conditioning means and busy signals associated with all of the lines connected to said trunks.

4. In a transmission measuring system, a plurality of lines to be tested having transmission loss pads normally included therein, a plurality of groups of trunks, each formed from a plurality of individual trunks, means for connecting any one of the lines with one end of any one of the trunks, a testing circuit including transmission measuring means, means for connecting said testing circuit with the other end of any one of said trunks, means automatically responsive to such connection to display the busy signals associated with all of the lines connected with said trunks and means in said trunk circuits controlled from said testing circuit for causing the exclusion of said transmission loss pads from any of the respectively associated lines.

5. In a signaling system, a line, first and second relays connected in series with said line, a source of current adapted to be connected to said line to energize said second relay, a signal controlled by said second relay, a third relay, contact means associated with said first and third relays normally cooperating to short-circuit said first relay, a second source of current, operator controlled means for connecting said second source of current to said third relay to cause its operation to open the short circuit around the first relay and permit its operation, and other contact means associated with said first relay responsive to its operation to short-circuit said second relay.

In witness whereof, I hereunto subscribe my name this 23d day of May, 1929.

HENRY W. O'NEILL.